United States Patent
Bethge et al.

(10) Patent No.: US 11,289,975 B2
(45) Date of Patent: Mar. 29, 2022

(54) FLUID-COOLED ACTIVE PART, ELECTRIC MACHINE, AND DRIVE SYSTEM

(71) Applicant: SIEMENS AKTIENGESELLSCHAFT, Munich (DE)

(72) Inventors: Andreas Bethge, Berlin (DE); Matthias Johannes Burghard, Berlin (DE); Matthias Centner, Berlin (DE); Marco Festa, Falkensee (DE); Ilja Sabelfeld, Berlin (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 490 days.

(21) Appl. No.: 16/087,607

(22) PCT Filed: Jan. 24, 2017

(86) PCT No.: PCT/EP2017/051388
§ 371 (c)(1),
(2) Date: Sep. 21, 2018

(87) PCT Pub. No.: WO2017/162348
PCT Pub. Date: Sep. 28, 2017

(65) Prior Publication Data
US 2019/0109513 A1 Apr. 11, 2019

(30) Foreign Application Priority Data
Mar. 22, 2016 (EP) .................................... 16161663

(51) Int. Cl.
*H02K 9/00* (2006.01)
*H02K 3/24* (2006.01)
(Continued)

(52) U.S. Cl.
CPC .................. *H02K 9/00* (2013.01); *H02K 3/24* (2013.01); *H02K 3/345* (2013.01); *H02K 9/19* (2013.01); *H02K 9/22* (2013.01); *H02K 2209/00* (2013.01)

(58) Field of Classification Search
CPC ............ H02K 9/00; H02K 3/24; H02K 3/345; H02K 9/19; H02K 9/22; H02K 2209/00
See application file for complete search history.

(56) References Cited

U.S. PATENT DOCUMENTS 2,791,707 A * 5/1957 Willyoung ............... H02K 3/24
310/61
2,873,393 A * 2/1959 Baudryrenea ............ H02K 9/00
310/55

(Continued)

FOREIGN PATENT DOCUMENTS

| CH | 332979 A | 9/1958 |
|---|---|---|
| CN | 1649236 A | 8/2005 |

(Continued)

OTHER PUBLICATIONS ip.com results.*

(Continued)

*Primary Examiner* — Mohamad A Musleh
(74) *Attorney, Agent, or Firm* — Lempia Summerfield Katz LLC

(57) ABSTRACT

The invention relates to a fluid-cooled active part (1) for an electric machine (38), wherein the active part (1) is substantially cylindrical or hollow cylindrical, having axially extending grooves (2), at least one electrical conductor (3), which is arranged in the associated groove (2) at least in some sections and which is composed of a plurality of partial conductors (4), one or more main insulators (5), each arranged between the associated conductor (3) and the (Continued)

associated groove (2), and partial-conductor insulators (6), each surrounding the associated partial conductor (4). The invention further relates to an electric machine (38), having such a fluid-cooled active part (1) designed as a stator (39) and/or such a fluid-cooled active part (1) designed as a rotatably mounted rotor (40), wherein the electric machine (38) can be operated with a voltage in the range of at least a few kilovolts, preferably a few tens of kilovolts. Finally, the invention relates to a drive System (41), having such an electric machine (38) and a fluid energy machine (42) for the fluid, wherein the fluid energy machine (42) is designed as a compressor, in particular for process gas, or as a pump, in particular for a process liquid. In order to provide, among other things, a high-performance fluid-cooled active part that is compact and, in particular, resistant in the environment of the fluid or of a process fluid, it is proposed, among other things, that the active part (1) has one or more cooling Channels (7) for conducting the fluid, in particular a process fluid, wherein each cooling Channel (7) is arranged between the associated main insulator (5) and the respective partial-conductor insulators (6).

4 Claims, 12 Drawing Sheets

(51) Int. Cl.
*H02K 3/34* (2006.01)
*H02K 9/19* (2006.01)
*H02K 9/22* (2006.01)

(56) References Cited

U.S. PATENT DOCUMENTS

| | | | | | |
|---|---|---|---|---|---|
| 3,624,432 | A | * | 11/1971 | Merz | H02K 3/24 |
| | | | | | 310/53 |
| 3,781,581 | A | * | 12/1973 | Lehuen | H02K 3/24 |
| | | | | | 310/215 |
| 4,282,450 | A | * | 8/1981 | Eckels | H02K 55/04 |
| | | | | | 310/52 |
| 4,602,180 | A | * | 7/1986 | Olson | H02K 3/38 |
| | | | | | 310/215 |
| 2005/0162025 | A1 | | 7/2005 | Sivasubramaniam | |
| 2009/0196764 | A1 | | 8/2009 | Fogarty | |
| 2010/0090549 | A1 | * | 4/2010 | Gerstler | H02K 15/022 |
| | | | | | 310/58 |
| 2010/0264761 | A1 | | 10/2010 | Durantay | |
| 2013/0002067 | A1 | | 1/2013 | Bradfield | |
| 2016/0036277 | A1 | * | 2/2016 | Lynch | H02K 3/34 |
| | | | | | 310/54 |
| 2018/0212493 | A1 | * | 7/2018 | Oechslen | H02K 9/197 |
| 2018/0367011 | A1 | * | 12/2018 | Bodla | H02K 15/10 |

FOREIGN PATENT DOCUMENTS

| | | |
|---|---|---|
| CN | 102857018 A | 1/2013 |
| DE | 102009003424 A1 | 8/2009 |
| EP | 0026099 A1 | 4/1981 |
| EP | 1863152 A2 | 12/2007 |
| EP | 2239828 A2 | 10/2010 |
| EP | 2267869 B1 | 10/2012 |
| EP | 1967286 B1 | 5/2014 |
| GB | 172939 A | 8/1922 |
| GB | 720295 A | 12/1954 |
| GB | 722152 A | 1/1955 |
| RU | 2442880 C2 | 2/2012 |
| WO | WO2009046070 A2 | 4/2009 |
| WO | WO2015021977 A2 | 2/2015 |

OTHER PUBLICATIONS

Global dossier result.*
Russian Office Action for related Russian Application No. 2018133483, dated Jun. 7, 2019, with English translation.
Chinese Office Action for Chinese Application No. 201780019564.1 dated Dec. 23, 2019, with English translation.
European Search Report for European Patent Application No. 16161663.6-1809 dated Sep. 20, 2016.
PCT International Search Report and Written Opinion of International Searching Authority dated Feb. 28, 2017 corresponding to PCT International Application No. PCT/EP2015/081332 filed Dec. 29, 2015.

* cited by examiner

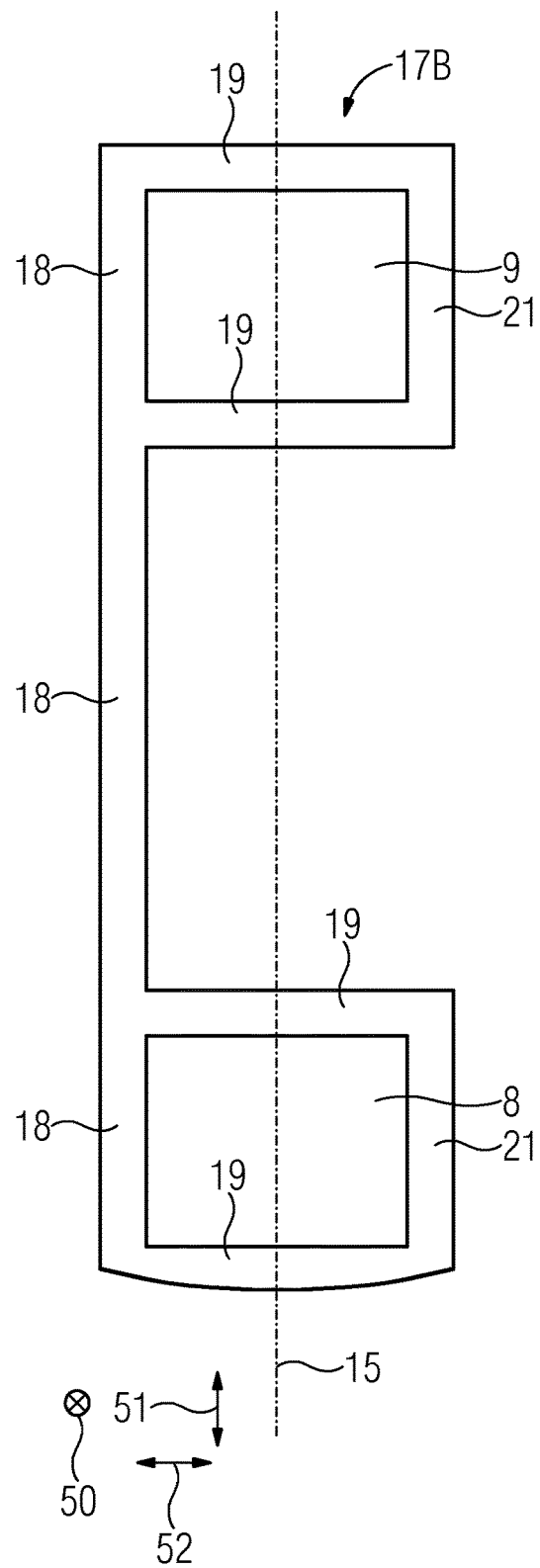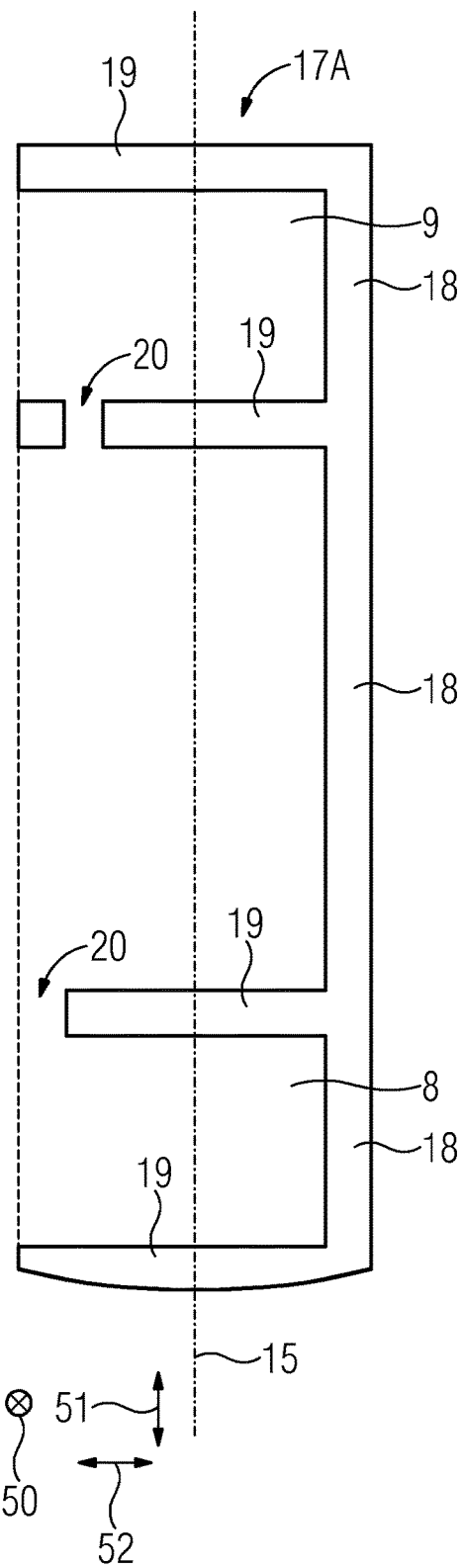

FLUID-COOLED ACTIVE PART, ELECTRIC MACHINE, AND DRIVE SYSTEM

This application is the National Stage of International Application No. PCT/EP2017/051388, filed Jan. 24, 2017, which claims the benefit of European Patent Application No. 16161663.6, filed Mar. 22, 2016. The entire contents of these documents are hereby incorporated herein by reference.

BACKGROUND

The present embodiments relates to a fluid-cooled active part for an electric machine.

An active part and an electric machine are used, for example, when conveying oil and gas. A trend in the development of machines for the oil and gas sector is the integration of the drive motor in the housing of the machine with the primary goal of being able to dispense with the seal on rotating parts. These are referred to as hermetically sealed systems. However, this also creates the possibility of motor components coming into contact with the process gas. In many applications, it is even desirable to cool the motor directly by the process gas in the primary cooling circuit.

Process gases may contain chemically aggressive media, which then lead to accelerated aging of materials. Often, process gas is a slightly refined gas, as the process gas is extracted from a well. The gas pressure in the cooling circuit roughly corresponds to static pressure of the process gas and, depending on the process control and special situations, is subject to strong fluctuations. Pressures up to 200 bar may occur. A third problem is the frequently high water content in the gas, which results in an increased electrical conductivity. In many cases, the inflowing cooling gas is saturated with water. Other liquids may also be part of the cooling medium.

Passive components may be protected from aging by metallic coatings or the use of alternative materials. In the case of the active parts of the motor, other material parameters, such as the magnetic permeability or electrical conductivity are of such importance that the use of resistant metallic materials or coating with such materials may lead to significantly poorer performance.

Traditionally, film and fabric layers with additional components are applied in order to insulate the windings of an electric machine, and these are then saturated with a synthetic resin. Many of the materials used are not resistant to the above-described gases or gas-liquid compositions. A conventional insulating system may be destroyed even by high static pressure.

One variant of motors for hermetically sealed compressors is configured as a canned motor. The can is used for sealing between stator and rotor cooling space. While the rotor is cooled by the process gas, oil flows through the stator. This variant has been found to be technologically complex, and the possible main dimensions are determined by the strength limits of the can. With asynchronous machines, the air gap sometimes is to be extended, which leads to a lower power factor and, consequently, to a larger power converter, owing to the working principle of this machine type.

In a second variant of motors, process gas flows through or over the rotor and the stator. The known motors, which are cooled with gas under high static pressure, are insulated with resin-saturated films and strips, with the materials being as insensitive as possible to the process gas. The technology for producing an insulating system of this kind is based on the traditional technology of winding insulation and saturation in the field of large electric machines and only requires some adjustments due to the materials used. The synthetic resin, which is conventionally introduced in a vacuum impregnation method, performs tasks of insulating, bonding, and stiffening of the winding.

One problem is the sensitivity to moisture absorption (e.g., after delamination of the main insulator). Delamination may be caused by pressure cycling in the process. The formation of a single conductive channel between a phase winding to ground potential or to a different phase element already leads to complete failure of the machine.

From US 2010/0264761 A1, a machine having a gas compressor and a rotating electric machine for driving the gas compressor is known, where the electric machine has a first electrical insulator and a second electrical insulator with polyetheretherketone (PEEK).

From EP 1 863 152 A2, a stator assembly for an electric machine is known, which is used to transport the liquid (e.g., oil or gas) through pipelines.

From EP 1 967 286 B1, an encapsulated stator assembly that may be used, for example, for compressors in the oil and gas industry is known.

From EP 2 267 869 B1, an electric machine with a seal assembly is known for use in corrosive environments.

From DE 10 2009 003 424 Al, an electric drive with a pressure housing is known for gas pipeline and storage compression applications.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a fluid-cooled active part that is powerful, compact, and resistant in the environment of the fluid or a process fluid, and overcomes the drawbacks of the prior art is provided. As another example, an electric machine or a drive system with an active part is provided.

An active part includes a respective cooling channel for guiding the fluid (e.g., a process fluid). The respective cooling channel is arranged between the respective main insulator and the respective sub-conductor insulator.

As another example, an electric machine or a drive system that includes a fluid-cooled active part configured as a stator and/or a fluid-cooled active part configured as a rotatably mounted rotor is provided.

The fluid-cooled active part is, for example, cylindrical in an embodiment as a rotor and hollow cylindrical in an embodiment as a stator for an electric machine. Accordingly, an axial direction along a machine axis and a radial direction are outwardly predefined by the machine axis. A corresponding cylinder coordinate system is completed by a circumferential direction perpendicular to the radial direction and around the machine-axis.

The active part has axially extending grooves that in the embodiment as a rotor or a stator for an inner rotor are arranged at the radial outer side or inner side of the active part (e.g., as open grooves). For example, the grooves may be incorporated into a laminated core or the like of the active part. Arranged in the respective groove is at least one electrical conductor that in each case is led out via a winding head region at the respective axial end face of the active part of the one groove and is inserted in the next groove.

The respective conductor is divided into a plurality of sub-conductors. A respective sub-conductor insulator is provided for the individual sub-conductors, and a main insulator is provided for insulating the respective conductor against the respective groove or against the laminated core. A high-performance plastic such as, for example, polyetheretherketone (PEEK) may be used for the respective main insulator and/or the respective sub-conductor insulator.

Polyetheretherketone has a number of advantages, such as, for example, a particular chemical and temperature resistance. This, for example, makes itself noticeable in that the material may be permanently used up to a temperature of 250° C. and has a high resistance to chemically aggressive substances (e.g., aqueous acids). PEEK is therefore particularly suitable for applications involving sour gas such as, for example, untreated natural gas or with acidic liquids, such as untreated crude oil. In addition to a resistance to hydrolysis and a good mechanical creep resistance, an electrical impact strength of 25 kV/mm makes the material particularly suitable for use in the electrical active part of one or more of the present embodiments or the electric machine of one or more of the present embodiments, which may be operated with an electrical voltage of a few kilovolts or a few tens of kilovolts.

The active part of one or more of the present embodiments is characterized inter alia by the respective cooling channel that in each case is arranged between the respective main insulator and the respective sub-conductor insulator and by which the fluid (e.g., a process fluid) is guided within the active part. As already indicated, the fluid may be in the form of a liquid or gas and, for example, a process liquid, such as, for example, crude oil, or a process gas such as, for example, natural gas. Since the fluid is guided in the respective cooling channel between the respective main insulator and the sub-conductor insulator, particularly direct cooling of the respective conductor is achieved. The heat losses resulting during the operation of the active part may therefore be transported away virtually directly at the site of origin, with thermal insulating paths that hinder heat transport being kept as low as possible.

Due to suitable insulating materials, such as, for example, the high-performance plastic discussed above, an electrical isolation of the respective sub-conductors and the respective conductor may be provided even under adverse environmental conditions, such as, for example, in the flowing around of the process fluid. Due to the very direct cooling of the respective conductor, a high power density of the machine may be achieved despite the additional space required for the cooling channels in the respective groove. One or more of the present embodiments therefore allow, for example, due to the guidance of the respective cooling channel, a powerful and compact active part to be provided.

In one embodiment, active part may also be operated with an electrical voltage in the range of at least a few kilovolts (e.g., a few tens of kilovolts). For example, the active part, the electric machine, or the drive system may be operated with an electric power of a few megawatts to a few tens of megawatts. The electric machine may be configured as an electric motor or a generator.

The fluid energy machine may be configured, for example, as a thermal or hydraulic flow or piston engine. For example, turbo-compressors for gases or turbo or centrifugal pumps for liquids may be considered as thermal or hydraulic flow machines, and, for example, piston compressors for gases or piston pumps for liquids may be used as thermal or hydraulic piston machines. The process fluid of the fluid energy engine may be used as the fluid for cooling the proposed active part or the proposed electric machine. The process fluid may be gaseous (e.g., be in the form of natural gas) or be liquid (e.g., in the form of crude oil), with the fluid energy machine being configured accordingly, as described above.

In an embodiment, the respective cooling channel has an inlet channel, an outlet channel, and a respective connecting channel for fluidically connecting the inlet channel to the outlet channel. The respective groove has a groove base and two groove walls, where the respective inlet channel or outlet channel is arranged between the respective conductor and the groove base or the groove opening opposite the groove base in the radial direction. The respective connecting channel is arranged at least predominantly between the respective conductor and one of the two groove walls.

This kind of design of the respective cooling channel provides that the fluid may flow along the side surfaces of the respective conductor, viewed in the circumferential direction, and causes a good removal of the heat losses resulting in the respective conductor during operation. For this purpose, in each case, an inlet channel is provided between the respective conductor and the groove base, and an outlet channel is provided between the respective conductor and the groove opening. The connecting channel produces a connection between the inlet channel and the outlet channel. The respective inlet channel and the respective outlet channel in the axial direction may be largely formed continuously along the respective groove.

The respective connecting channel provides, for example, that the fluid predominantly flows in the radial direction from the respective inlet channel to the respective outlet channel. A flow component may also be provided along the axial direction (e.g., if an axial offset is present between the respective input and the respective outlet). An offset of this kind occurs, for example, due to the fact that the respective inlet is arranged at one of the end faces of the respective groove and the respective outlet at the opposing end face or, for example, is arranged in the region of the axial center of the respective groove.

A type of spacer or other support structure may, for example, be provided for the formation of the respective cooling channel.

In a further embodiment, the respective main insulator has two essentially C-shaped insulating half-shells, which together essentially surround the respective conductors in a plane perpendicular to the axial direction, with the two respective insulating half-shells being arranged essentially symmetrically to the groove center in the circumferential direction of the respective groove. The two respective insulating half-shells are sealed in the radial direction by a respective sealing element, including, for example, a fluororubber.

In a cross-section perpendicular to the axial direction through the active part, the respective conductor is therefore surrounded by the two insulating half-shells. The respective insulating half-shell has an essentially C-shaped cross-section in this plane, with the two insulating half-shells facing each other and being arranged essentially symmetrically to the groove center. This produces two supporting or contact lines radially inwardly and radially outwardly for the two insulating half-shells, with a respective sealing element for sealing the respective main insulator in the radial direction being provided on these lines extending in the axial direction.

To simplify the sealing of the two insulating half-shells in the radial direction and to make the sealing more reliable, the respective insulating half-shell may in each case have a kind of hook in the region of the supporting or contact lines. The hook points in the radial direction toward the respective conductor. An enlarged supporting or contact surface, respectively, is formed as a result.

As a sealing material for the respective sealing element, for example, a fluororubber is used, which is characterized by a chemical resistance, even in adverse environmental conditions, and good electrical insulator properties. The fluororubber (FPM) may be present, for example, in the form of a perfluoro rubber (FFPM).

In an alternative embodiment, the respective main insulator at least largely covers the groove base and the two groove walls of the respective groove. A plurality of channel half-shells are arranged one behind the other in the axial direction, with the respective channel half-shell having an essentially U-shaped cross-section in a plane perpendicular to the axial direction and largely surrounding the respective conductor in this plane.

The respective main insulator therefore lines the respective groove and provides a reliable electrical isolation between the respective conductor and, for example, the laminated core of the active part. The respective conductor is positioned, for example, by the channel half-shells within the respective groove, with the respective channel half-shells having an essentially U-shaped cross-section in a cross-section perpendicular to the axial direction. The respective channel half-shell is arranged such that the respective channel half-shell largely surrounds the respective conductor, viewed in this cross-section, so the respective U of the respective channel half-shell points in one or the other circumferential direction.

For example, some of the channel half-shells are arranged mirror-inverted to the other channel half-shells with respect to the groove center in the circumferential direction of the respective groove. In accordance with this example, the channel half-shells are arranged such that some point in the one circumferential direction and some in the other, opposite circumferential direction. For example, the channel half-shells provides guidance of the fluid in addition to positioning and the electrical insulation of the respective conductor.

In a further embodiment, the respective channel half-shell, viewed in a plane perpendicular to the axial direction, has at least one radial web extending along the respective conductor in the radial direction and two pairs of circumferential webs pointing in the circumferential direction, which are connected by the radial web. The one pair of circumferential webs is configured for forming the respective inlet channel, and the other pair of circumferential webs is configured for forming the respective outlet channel. In at least a first channel half-shell, in each case, at least one of the two central circumferential webs is designed for forming at least some of the respective connecting channel.

The cross-section of the respective channel half-shell perpendicular to the axial direction may be well illustrated, for example, using the letter "E", which consists of one vertical line and three horizontal lines. The radial web or a circumferential web of the respective channel half-shell corresponds to the vertical line or a horizontal line of the "E". Unlike the letter "E", however, the respective channel half-shell has two pairs of circumferential webs, and therefore, four circumferential webs instead of only three horizontal lines in the letter "E".

The respective channel half-shell is configured such that the, for example, radially inner and radially outer pair of circumferential webs together with the radial web largely surrounds the respective inlet channel or outlet channel. In one embodiment, the respective conductor is arranged between the two middle circumferential webs. The respective radial web extends in the radial direction along the respective conductor and is arranged between the respective conductor and one of the two corresponding groove walls.

The channel half-shells include at least a first channel half-shell, by which at least some of the respective connecting channel is formed. In For example, the respective first channel half-shell provides a sufficient cavity between the respective conductor and the corresponding groove wall for the respective connecting channel. For example, the respective cavity is arranged opposite the respective radial web in the circumferential direction in relation to the respective groove center. For example, the respective first channel half-shell may provide a connection of the respective inlet channel and/or the respective outlet channel to the respective connecting channel.

In a further embodiment, a respective through-opening remains between at least one of the two central circumferential webs of the respective first channel half-shell and the respective main insulator, and/or at least one of the two central circumferential webs of the respective first channel half-shell has a respective through-opening.

The respective through-opening therefore constitutes a part of the respective connecting channel, by which the fluid may flow from the respective inlet channel into the region to the side of the respective conductor, and/or the fluid may flow from the region to the side of the respective conductor into the respective outlet channel. The region to the side of the respective conductor is arranged to adjoin the respective conductor in the circumferential direction.

The respective through-opening is arranged at one or both of the two central circumferential webs of the respective first channel half-shell or remains between one of these circumferential webs and the respective main insulator.

In a further embodiment, with at least one second channel half-shell, in each case, the circumferential webs of at least one of the two pairs of circumferential webs are connected by a respective end web such that the respective second channel half-shell, viewed in a plane perpendicular to the axial direction, has a rectangular cross-section for guiding the respective cooling channel.

The respective end web may be arranged opposite the respective radial web in the circumferential direction in relation to the respective groove center. The respective end web allows good guidance of the flowing fluid and increased mechanical stability since, for example, the respective conductor is additionally supported in the radial direction.

In a further embodiment, at least two electrical conductors are arranged in the respective groove one above the other in the radial direction, with a respective intermediate element for sealing and/or tolerance compensation being provided. The respective intermediate element is arranged in the radial direction between one of the half-shells of the upper electrical conductor and one of the half-shells of the lower electrical conductor.

If two electrical conductors configured as a bar winding are arranged in the respective groove, that electrical conductor that is arranged closer to the groove opening or on the groove base is often characterized as an upper or lower bar. However, arrangement of more than two electrical conductors in the respective groove may be provided.

Channel half-shells are associated with each of the conductors in the groove, and these largely surround the respective conductor, viewed in a cross-section perpendicular to the axial direction, in pairs. In this case, a respective intermediate element is provided between the half-shells of adjacent conductors, and this is used for sealing and/or tolerance compensation. A seal is advantageous to avoid undesirable flow losses between the inlet channel and the outlet channel of adjacent conductors. Tolerance compensation has the advantage that manufacturing tolerances may be roughly adhered to, and this saves costs. The complete arrangement located in the respective groove in the radial direction may be fixed, for example, by a groove closure at the respective groove opening, and therefore, wobbling of this arrangement may, for example, be reliably prevented.

For the respective intermediate element (e.g., a fluororubber) that, as has already been explained above, is characterized by chemical resistance, even under adverse environmental conditions, and good electrical insulating properties may be used. The fluororubber (FPM) may also be present, for example, in the form of a perfluoro rubber (FFPM).

In an alternative embodiment, the respective main insulator at least largely covers the groove base and the two groove walls of the respective groove, where at least two electrical conductors are arranged in the respective groove one above the other in the radial direction. A respective conductor shell that surrounds the respective conductor in a plane perpendicular to the axial direction, with both the respective groove, at least in the region of the lower electrical conductor and the respective conductor shell of the lower conductor, tapering in the direction of the groove base such that the respective conductor shell of the lower conductor is positively fixed in the direction of the groove base and a first, axially extending cavity (e.g., for a first inlet channel) remains between the groove base and the respective conductor shell of the lower conductor.

The respective main insulator therefore lines the respective groove and provides a reliable electrical isolation between the respective electrical conductor and, for example, the laminated core of the active part. The respective electrical conductor is positioned, for example, by the respective conductor shell within the respective groove, where the respective conductor shell largely surrounds the respective conductors, viewed in the cross-section perpendicular to the axial direction.

If, for example, two electrical conductors are arranged one above the other in the respective groove, the two electrical conductors are often referred to as an upper bar or lower bar if the two electrical conductors are configured as a bar winding. The upper bar or the lower bar is that electrical conductor that is arranged closer to the groove opening or the groove base.

Particularly good fixing of the lower conductor in the respective groove is achieved, for example, by the following arrangement. In principle, the respective groove may have a constant groove width in the circumferential direction from radially inside to radially outside. However, a taper of the respective groove in the direction of the groove base is provided, at least in the region of the lower conductor. The respective conductor shell of the lower conductor also has a corresponding taper in the direction of the groove base. The corresponding tapers are configured such that the respective conductor shell of the lower conductor is positively fixed in the respective groove in the direction of the groove base and the first cavity remains between the groove base and the respective conductor shell. Therefore, the first cavity is provided, for example, for the first inlet channel, and mechanically stable positioning of the respective lower conductor in the respective groove is provided.

For example, the respective conductor shell may be configured in two parts by including a first conductor shell part, which has an essentially U-shaped cross-section in a plane perpendicular to the axial direction, and a second conductor shell part. The second conductor shell part is configured as a kind of cover for the first conductor shell part, so the respective conductor arranged in the conductor shell is surrounded by the two conductor shell parts, viewed perpendicularly to the axial direction. Particularly good enclosure of the respective conductor is achieved, for example, in that the second conductor shell part has two grooves, and the first conductor shell part has two corresponding tongues for a respective tongue and groove connection. For sealing and therefore protection of the respective conductor from fluid flowing in the respective cavity, for example, owing to the advantageous properties described above, a fluororubber may be used in the region of the tongue and groove joint. The respective conductor shell may be pre-tensioned in the circumferential direction with this material, owing to an elasticity, and this further improves fixing of the respective conductor in the respective groove.

In a further embodiment, at least a first insert that in each case has an H-shaped cross-section in a plane perpendicular to the axial direction is provided. The respective first insert is arranged between the respective conductor shell of the lower electrical conductor and the respective conductor shell of the upper electrical conductor and is configured such that a second or third, axially extending cavity (e.g., for a first outlet channel or a second inlet channel) remains between the respective conductor shell of the lower conductor or the upper conductor and the respective first insert.

The respective first insert allows mechanically stable positioning of the respective upper conductor in the respective groove and simultaneously provides the second and third cavity (e.g., for the first outlet channel and the second inlet channel). For this purpose, the respective first insert is configured to be H-shaped in a cross-section perpendicular to the axial direction, with the respective first insert serving as a type of spacer between the two adjacent conductors and creating the second and third cavities thereby.

In a further embodiment, the respective first insert, in a plane perpendicular to the axial direction, has two outer webs that point in the direction of the groove opening and are arranged at least in certain sections in the circumferential direction between the respective conductor shell of the upper conductor and the respective groove wall. The two outer webs taper in the direction of the groove opening, and the respective conductor shell of the upper conductor tapers in certain sections in the direction of the groove base such that the respective conductor shell of the upper conductor is non-positively fixed in the radial direction.

The respective outer web of the H-shaped first insert pointing in the direction of the respective groove opening is therefore arranged between the respective conductor shell of the upper conductor and the groove wall, with the two outer webs tapering in the direction of the groove opening. Non-positive fixing of the respective conductor shell of the upper conductor in the radial direction is achieved, for example, with a constant groove width in the region of the upper conductor in that the respective conductor shell of the upper conductor tapers in certain sections in the direction of the groove base. Therefore, the respective first insert may be introduced into the respective groove, and then the respective conductor shell of the upper conductor may be introduced into the respective groove by pressing this conductor shell between the two outer webs of the respective first insert in the direction of the groove base. This results in reliable positioning of the respective upper conductor as a whole, and at the same time, the third cavity is formed (e.g., for the second inlet channel).

In a further embodiment, at least one second insert that in each case has a U-shaped cross-section in a plane perpendicular to the axial direction is provided. The respective second insert is arranged and configured such that a fourth axially extending cavity (e.g., for a second outlet channel) remains between the respective conductor shell of the upper conductor and the respective second insert.

The respective second insert may be positioned such that the U-shaped cross-section, viewed perpendicularly to the axial direction, points toward the groove base. In principle, an arrangement of the respective second insert in which the U-shaped cross-section, viewed perpendicularly to the axial direction, points in one of the circumferential directions or towards the groove opening may also be provided. The fourth cavity, which is provided, for example, for the second outlet channel, remains between the respective second insert and the respective conductor shell of the upper conductor. If the U-shaped cross-section points in the direction of the groove opening, the fourth cavity may, for example, be closed by a corresponding groove closure.

In a further embodiment, the respective second insert, in a plane perpendicular to the axial direction, has two inner webs that point in the direction of the groove base and are arranged at least in certain sections in the circumferential direction between the respective conductor shell of the upper conductor and the respective groove wall. The two inner webs taper in the direction of the groove base, and the respective conductor shell of the upper conductor tapers in certain sections in the direction of the groove opening such that the respective conductor shell of the upper conductor and the respective second insert are non-positively fixed in the radial direction.

The respective inner web of the U-shaped second insert pointing in the direction of the groove base is therefore arranged between the respective conductor shell of the upper conductor and the groove wall, with the two inner webs tapering in the direction of the groove base. Non-positive fixing of the respective conductor shell of the upper conductor in the radial direction is achieved or reinforced, for example, with a relaxed groove width in the region of the upper conductor in that the respective conductor shell of the upper conductor tapers in certain sections in the direction of the groove opening. Therefore, the respective conductor shell of the upper conductor may be introduced into the respective groove and then the respective second insert may be introduced into the respective groove by the respective inner web of the second insert being introduced into the gap between the conductor shell of the upper conductor and the groove wall, and the second insert part being pressed in the direction of the groove base. This results in reliable positioning of the respective upper conductor and the respective second insert overall, and at the same time, the fourth cavity is formed (e.g., for the second outlet channel).

In a further embodiment, two respective inserts are arranged one behind the other in the axial direction, where a respective axial gap remains in the region of the axial center between the two respective inserts. The first cavity and the third cavity in the region of the axial center are closed by a respective cover. The second cavity and the fourth cavity at the respective axial end face are closed by a respective cover.

Due to such a configuration of the active part, the fluid is supplied in the active part at two end faces and led out again from the active part in the region of an axial center. The first cavity and the third cavity serve as an inlet channel or the second cavity and the third cavity serve as an outlet channel for the lower and upper conductors. To avoid undesirable flow losses, respective covers that close the first cavity and the third cavity in the region of the axial center and close the second cavity and the fourth cavity at the respective axial end face are provided.

In a further embodiment, the respective conductor shell has recesses running in the radial direction for forming the respective connecting channel.

The respective recess may run largely or completely along the side surface of the respective conductor, with the side surface extending in the radial direction and in the axial direction. Therefore, the recesses provide for a flow of fluid around the respective conductor, so good cooling of the respective conductor may be provided.

In order to minimize the risk of potential electrical breakdowns in the region of the winding heads at the respective axial end face of the active part, it may be advantageous to not provide any recesses of this kind in the respective conductor shell in the immediate vicinity of the respective axial end face. Depending on the size of the active part, the applied electrical voltage and the insulating properties of the main insulator and the sub-conductor insulator, it may be appropriate to provide none of the recesses discussed above, starting from the respective axial end face of a few centimeters up to a few tens of centimeters. Similarly, it may also be advantageous in the region of the described gap to not provide any recesses of this kind in the respective conductor shell in the immediate vicinity of the gap.

In a further embodiment, the respective groove in the radial direction is closed in the region of the groove opening by a groove closure element, with a tolerance compensation element being arranged between the respective groove closure element and the at least one conductor.

For the respective tolerance compensation element, a fluororubber may, for example, be used, which, as has already been described above, is characterized by chemical resistance, even under adverse environmental conditions, and good electrical insulating properties. The fluororubber (FPM) may also be present, for example, in the form of a perfluoro rubber (FFPM).

In a further embodiment, the respective main insulator and/or the respective sub-conductor insulator includes polytetrafluoroethylene (PTFE).

The use of polytetrafluoroethylene for the respective main insulator and/or for the respective sub-conductor insulator offers great advantages, even with respect to the use of the polyetheretherketone (PEEK) already described above. For example, PTFE has a continuous use temperature of −200° C. to +260° C. PTFE has nearly complete chemical resistance, since the linear combination of fluorine and carbon to polytetrafluoroethylene produces one of the strongest bonds in inorganic chemistry due to the high electronegativity of fluorine.

Just like PEEK, PTFE is resistant to hydrolysis, where the respective creep resistance is similarly also good, but with PTFE, the respective creep resistance is adjusted by the addition of suitable fillers. The closely spaced static and dynamic coefficients of friction of PTFE produce excellent sliding properties that prevent the "stick-slip effect" (e.g., an abrupt change from sliding and stopping).

A process fluid may be used as fluid in the proposed fluid-cooled active part, in the proposed electric machine, or in the proposed drive system. As already described above, the process fluid may be in liquid or gaseous form, and, for example, be a process liquid such as, for example, crude oil, or a process gas such as, for example, natural gas. For this purpose, the described advantageous materials may be used (e.g., polyetheretherketone (PEEK) or polytetrafluoroethylene (PTFE)) for the respective main insulator and/or for the respective sub-conductor, and fluororubber (FPM) or perfluoro rubber (FFPM) may be used for various seals and intermediate parts. Due to the use of the materials, one or more of the present embodiments are therefore ideally suited for operation in the environment of acidic or other aggressive process fluids, which for cooling, are also guided in the active part.

BRIEF DESCRIPTION OF THE DRAWINGS

FIGS. 1-12 show first to fifth exemplary embodiments of a fluid-cooled active part.

DETAILED DESCRIPTION

Figure 1:
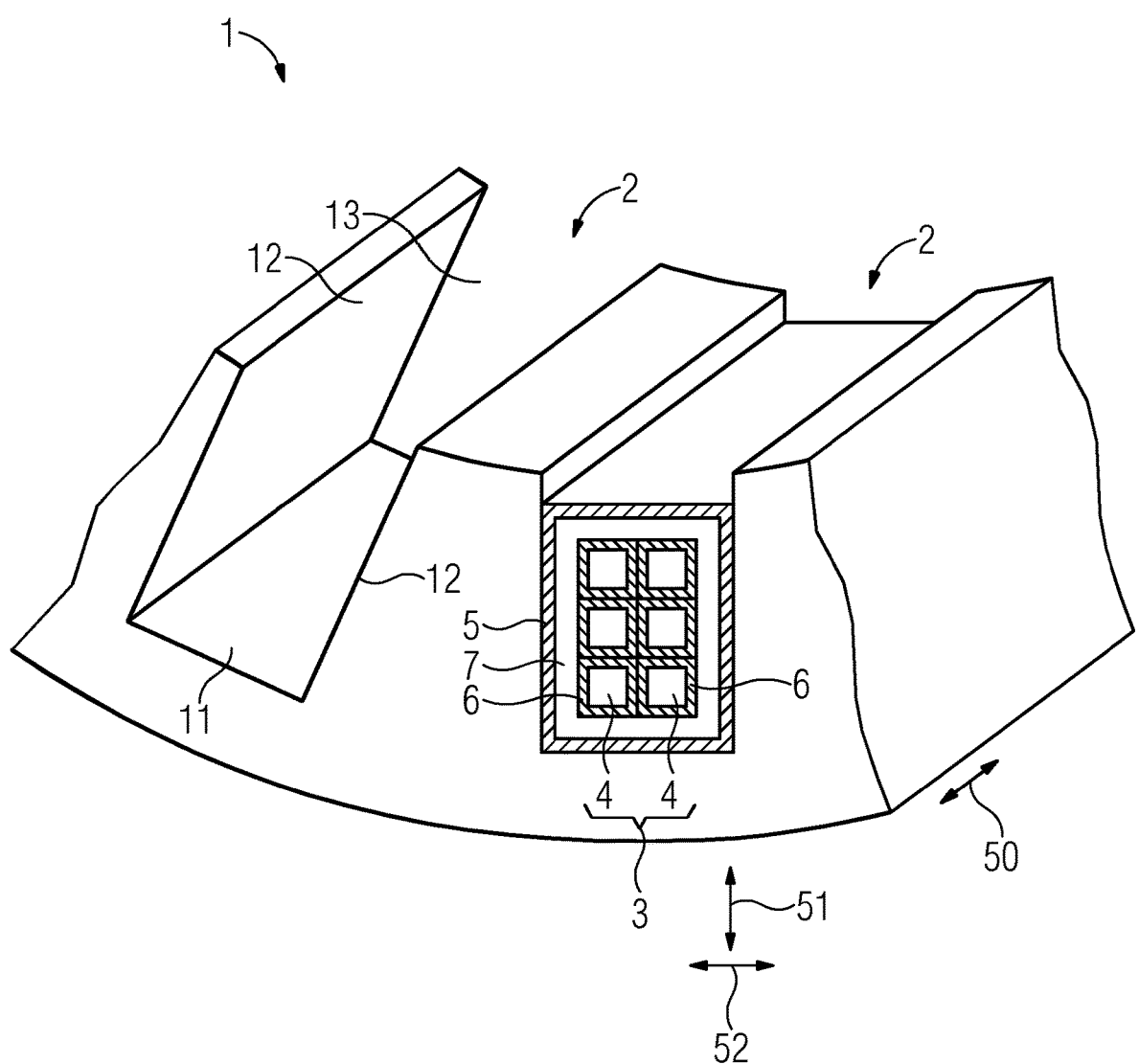

FIG. 1 shows a first exemplary embodiment of a proposed fluid cooled active part 1, with a perspective detail of a cross-section perpendicular to an axial direction 50 through the active part 1 being shown.

The active part 1 is essentially hollow cylindrical, so an axial direction 50, a radial direction 51, and a circumferential direction 52 are defined. The active part 1 has axially extending grooves 2 and electrical conductors 3 that are each arranged at least in certain sections in the respective groove 2. For the sake of clarity, FIG. 1 only indicates one conductor 3.

The respective conductor 3 is composed of a plurality of sub-conductors 4. Arranged between the respective conductor 3 and the respective groove 2 is a respective main insulator 5, with the respective conductor 4 being surrounded by a sub-conductor insulator 6.

The active part 1 has a respective cooling channel 7 for guiding the fluid (e.g., a process fluid), with the respective cooling channel 7 being arranged between the respective main insulator 5 and the sub-conductor insulator 6.

As indicated in FIG. 1, the respective groove 2 has a groove base 11, two groove walls 12, and a groove opening 13, with the grooves 2 being open radially inwards in the framework of the exemplary embodiment. In principle, the grooves 2 may also be open radially outwards.

Figure 2:
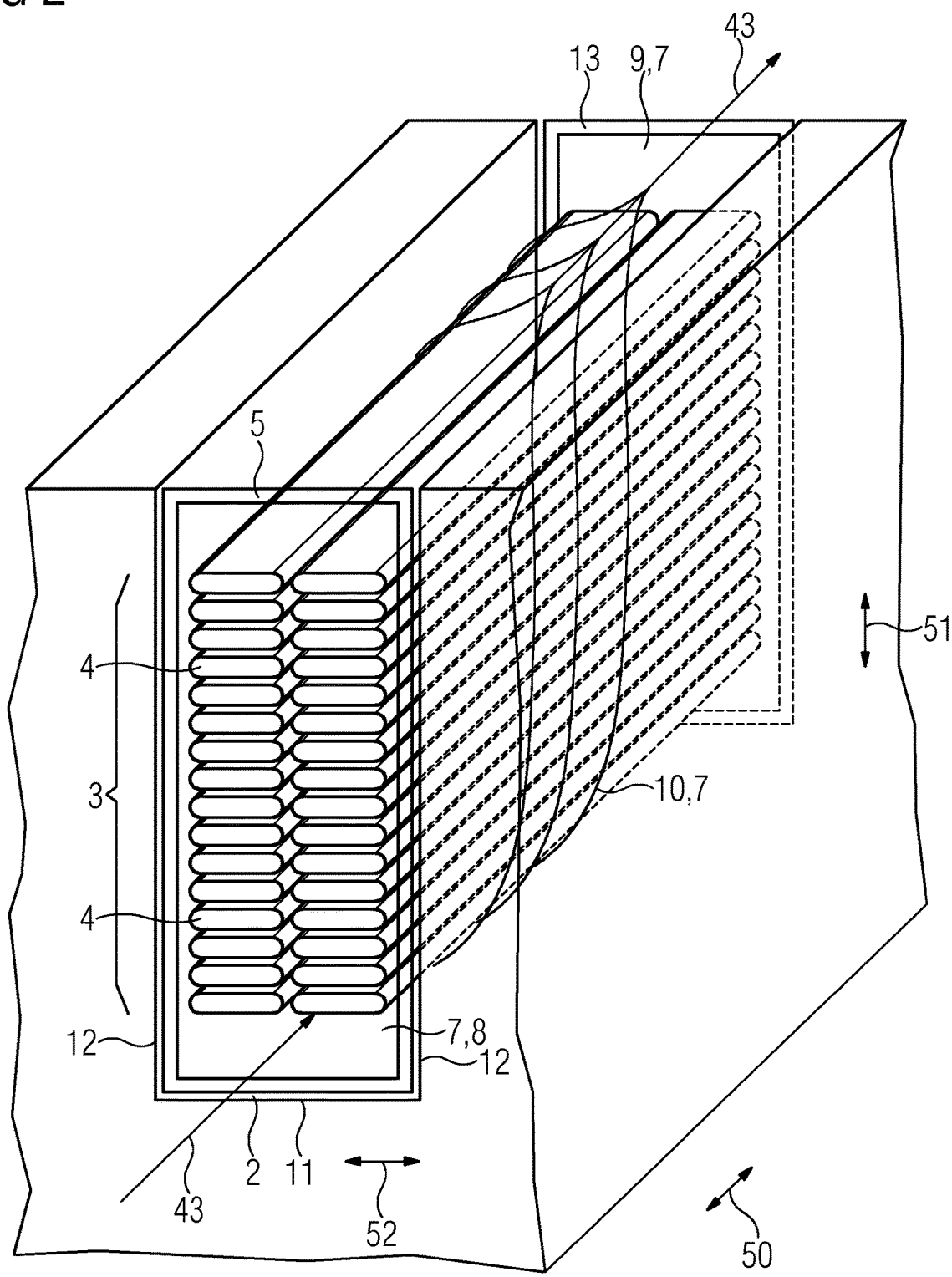

FIG. 2 shows a second exemplary embodiment of the fluid-cooled active part 1. The same reference numerals as in FIG. 1 designate the same objects.

Since the second exemplary embodiment has some similarities with the first exemplary embodiment, some differences will be explained below. The active part 1 of the second exemplary embodiment is characterized inter alia by the fact that a defined flow direction 43 is specified for the fluid within the respective groove 2. The respective cooling channel 7 includes an inlet channel 8, an outlet channel 9, and a respective connecting channel 10 that fluidically connects the inlet channel 8 to the outlet channel 9. The inlet channel 8 is arranged between the electrical conductor 3 and the groove base 11, and the outlet channel 9 is arranged between the respective conductor and the groove opening 13. The respective connecting channel 10 is primarily arranged between the conductor 3 and one of the two groove walls 12.

Figure 3:
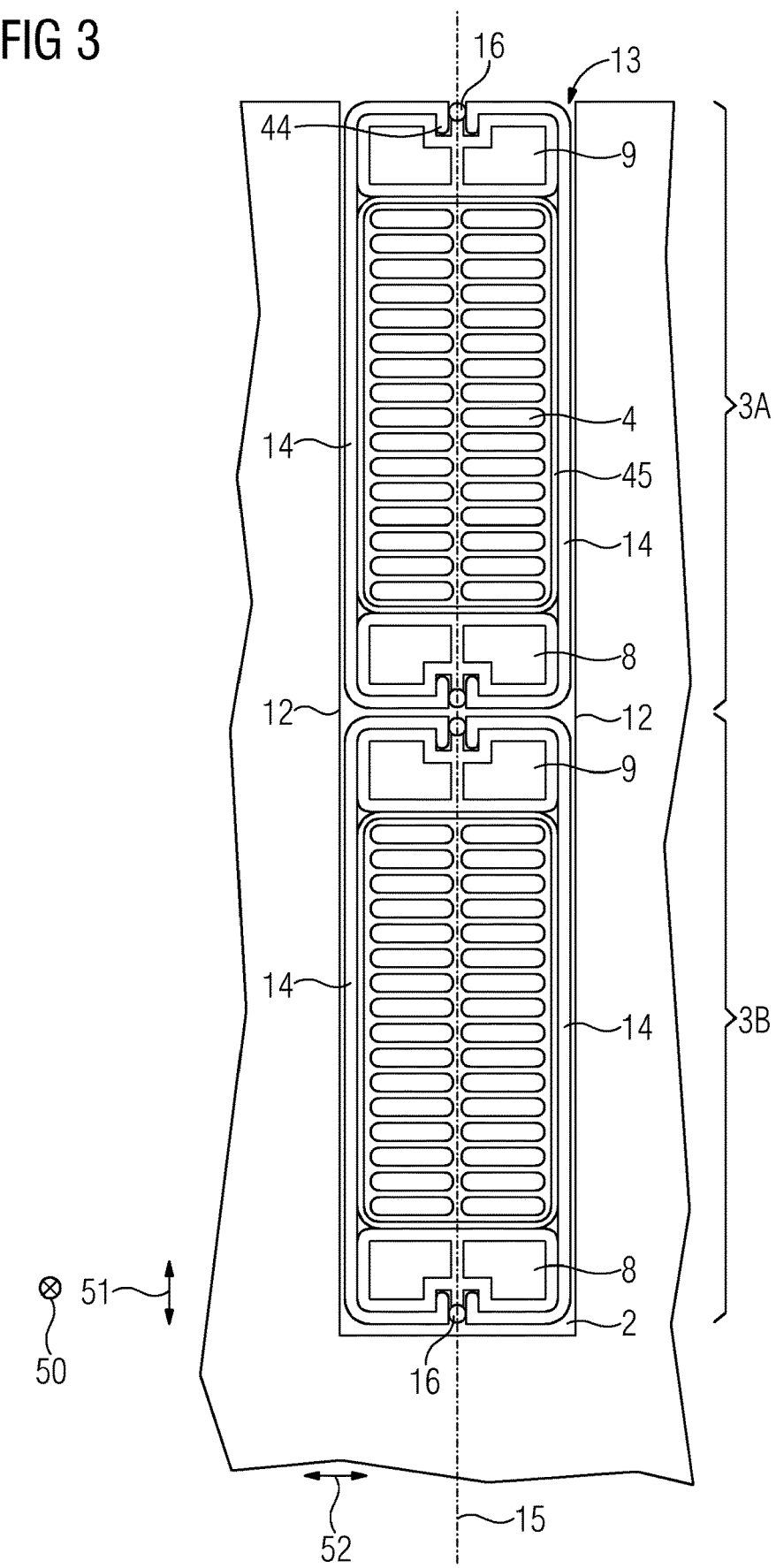
Figure 4:
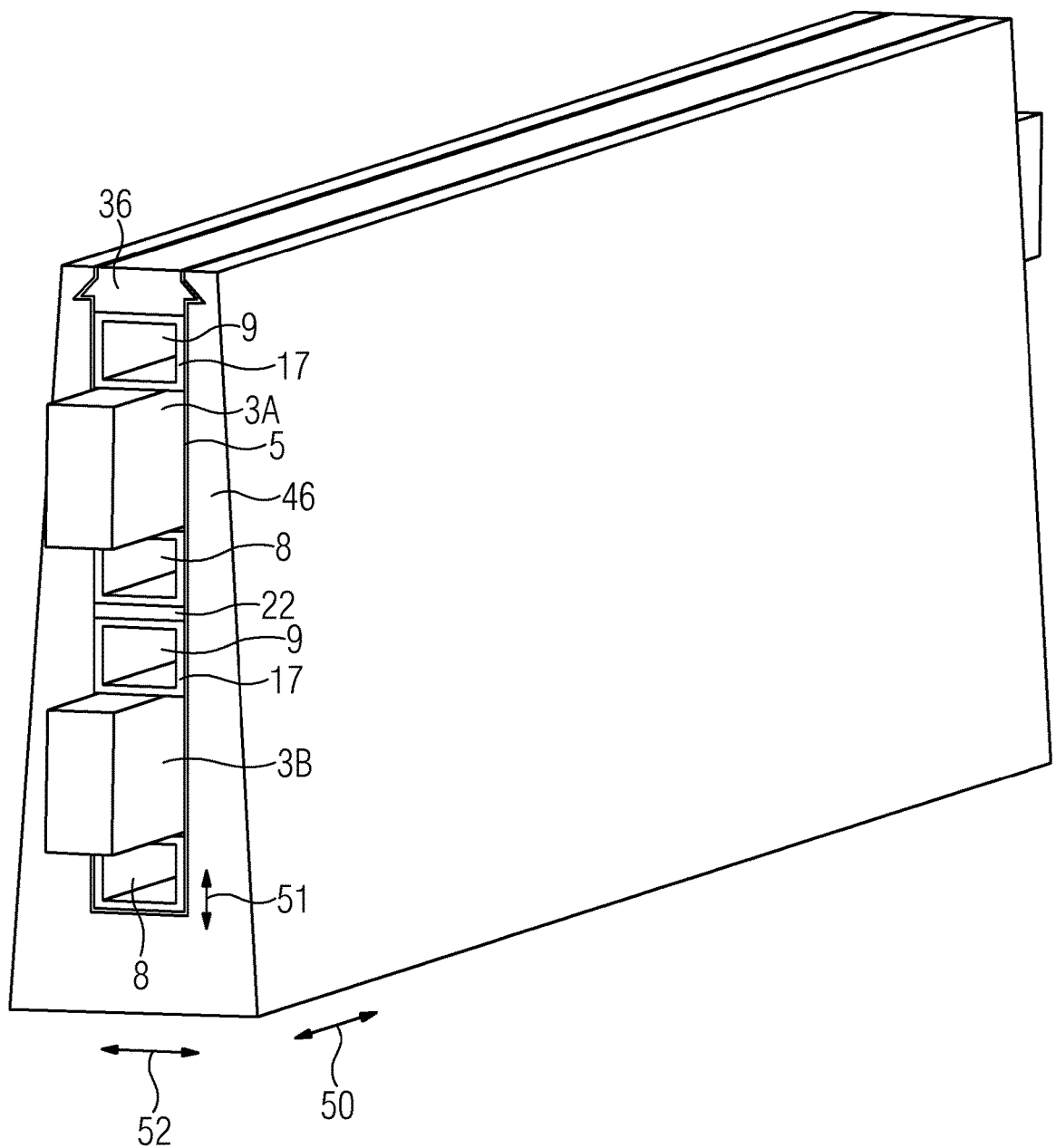

FIG. 3 shows a third exemplary embodiment of the fluid-cooled active part 1, with a detail of a cross-section perpendicular to the axial direction 50 through the active part 1 being shown.

Within the framework of the exemplary embodiment, two electrical conductors 3a, 3b are provided in the respective groove 2, and these are arranged one above the other in the radial direction 51. The conductor 3A is the upper conductor facing the groove opening 13, and the conductor 3B is the lower conductor facing the groove base 11. However, it is also possible for just one of the two conductors 3A, 3B to be provided in a variation of the exemplary embodiment.

A respective main insulator 5 is associated with each of the two conductors 3A, 3B, and in each case, includes two essentially C-shaped insulating half-shells 14. The two respective insulating half-shells 14 together surround the respective conductor 3A, 3B in a plane perpendicular to the axial direction 50. The two insulating half-shells 14 are arranged essentially symmetrically to the groove center 15 in the circumferential direction 52 of the respective groove 2. In the radial direction 51, the two respective insulating half-shells 14 are sealed by a respective sealing element 16, with the respective sealing element 16, for example, including a fluororubber. Arranged within a pair of insulating half-shells 14 are an inlet channel 8 and an outlet 9.

To simplify the sealing of the two respective insulating half-shells 14 and make it more reliable, the respective insulating half-shell 14 may in each case have a sort of hook 44 in a region of the supporting or contact lines, and this points toward the respective conductor 3A, 3B in the radial direction 51. The sealing element 16 is, as indicated in FIG. 3, arranged between two hooks 44 of two mating insulating half-shells 14. The hooks 44 may be regarded as optional. Similarly optional is a spacer 45 that is arranged between the plurality of sub-conductors 4 and the respective insulating half-shell 14, which, however, creates space for the respective connecting channel 10 in the framework of the exemplary embodiment.

An intermediate element (not shown) may be provided in the radial direction 51 between the insulating half-shells 14 of the upper conductor 3A and the lower conductor 3B for sealing and for tolerance compensation.

FIGS. 4 to 8 show a fourth exemplary embodiment of the fluid-cooled active part 1, with FIGS. 6 and 7 illustrating some details and a perspective detail of a cross-section perpendicular to the axial direction 50 through the active part 1 being shown.

Within the framework of the exemplary embodiment, two electrical conductors 3a, 3b are provided in the respective groove 2, and these are arranged one above the other in the radial direction 51. The conductor 3A is the upper conductor facing the groove opening 13, and the conductor 3B is the lower conductor facing the groove base 11. However, it is also possible for just one of the two conductors 3A, 3B to be provided in a variation of the exemplary embodiment.

The respective main insulator 5 is configured such that the respective main insulator 5 largely covers the groove base 11 and the two groove walls 12 of the respective groove 2.

Figure 5:
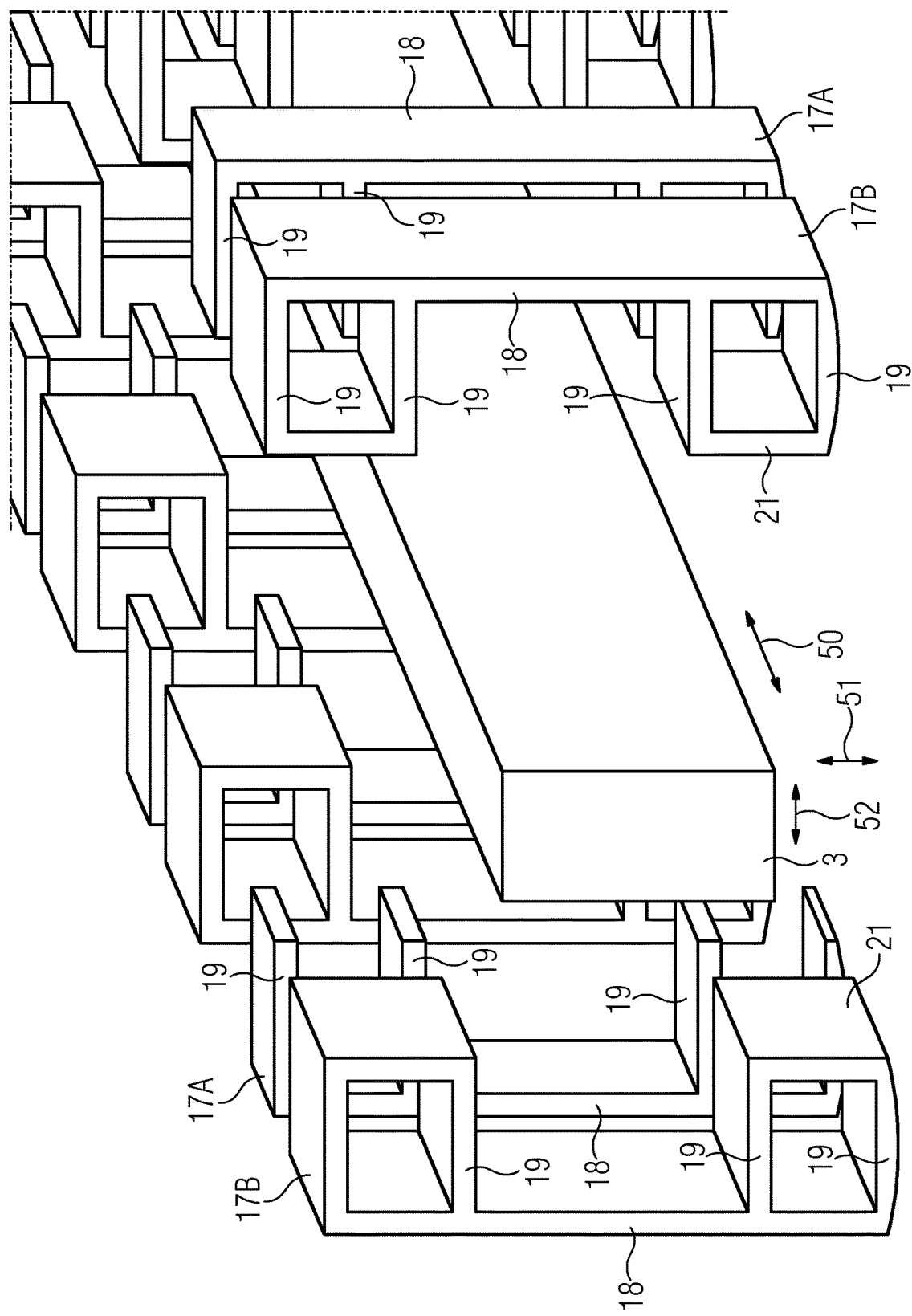
Figure 8:
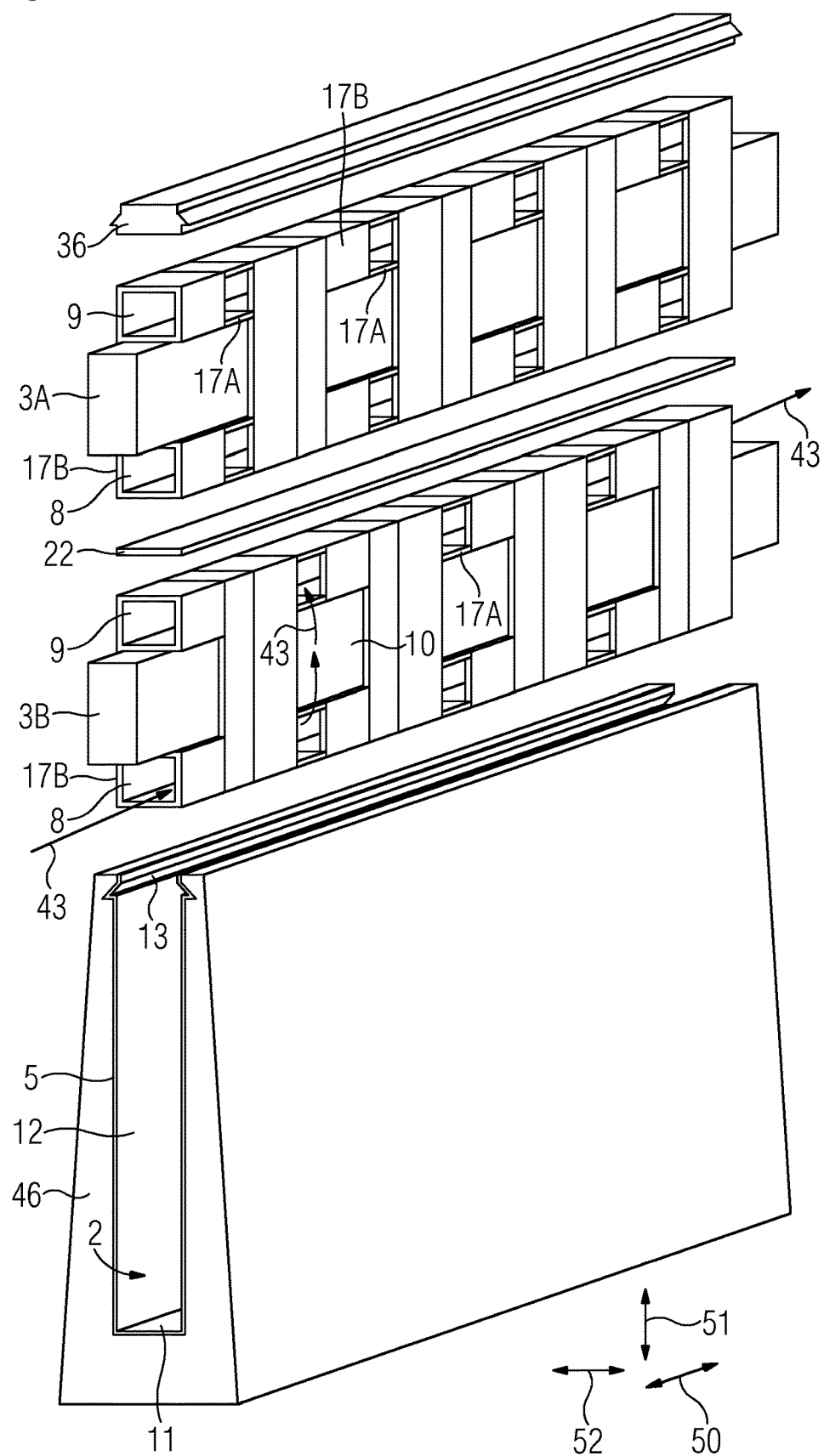

As shown in FIGS. 5 and 8, a plurality of channel half-shells 17 are arranged one behind the other in the axial direction 50, with some of the channel half-shells being arranged mirror-inverted to other channel half-shells 17 with respect to the groove center 15 in the circumferential direction 52 of the respective groove 2. In a plane perpendicular to the axial direction 50, the respective channel half-shell 17 has an essentially U-shaped cross-section and largely surrounds the respective conductor 3A, 3B.

Viewed in a plane perpendicular to the axial direction 50, the respective channel half-shell 17 has a radial web 18 as well as two pairs of circumferential webs 19. The respective radial web 18 extends in the radial direction along the respective conductor 3 and the respective circumferential web 19 points in the circumferential direction 52, with the circumferential webs 19 being connected by the radial web 18.

The respective inlet channel 8 and the respective outlet channel 9 are configured as follows by circumferential webs 19. The inlet channel 8 is arranged in the region of that pair of circumferential webs 19 that is closer to the groove base 11 (e.g., at the bottom in FIGS. 4 to 8), and the outlet channel 9 is arranged in the region of that pair of circumferential webs 19 that is closer to the groove opening 13 (e.g., at the top in FIGS. 4 to 8).

The active part 1 has first channel half-shells 17A that, as shown in FIG. 7, have middle circumferential webs 19 that have a respective through-opening 20 (e.g., upper one of the middle circumferential webs 19 in FIG. 7) or form a respective through-opening 20 that remains between the respective middle circumferential ridge 19 and the respective main insulator 5 (e.g., lower one of the central circumferential webs 19 in FIG. 7). The last-mentioned embodiment is achieved in that the corresponding circumferential web is configured somewhat shorter in the circumferential direction 19 than the remaining circumferential webs 19, and therefore, the through-opening 20 is formed. By way of such an embodiment of the respective first channel half-shell 17A, at least some of the respective connecting channel 10 is formed by at least one of the two central circumferential webs 19. In a variation of the exemplary embodiment, the respective first channel half-shell 17A may have just one through-opening 20 or two identical through-openings 20 of the above through-openings 20.

The active part 1 has second channel half-shells 17B in which in each case the circumferential webs 19 of a pair or both pairs of circumferential webs 19 are connected by a respective end web 21, as shown in FIG. 6. The second channel half-shells 17B are configured such that, viewed in a plane perpendicular to the axial direction 50, the second channel half-shells 17B each have a rectangular cross-section for guiding the respective cooling channel 7. In the present exemplary embodiment, two such rectangular cross-sections are formed, one for the inlet channel 8 and one for the outlet channel 9.

Provided in the radial direction 51 between the channel half-shells 17 of the upper conductor 3A and the lower conductor 3B is an intermediate element 22 for sealing and for tolerance compensation.

As indicated in FIG. 8 by the arrows 43 for the flow direction of the fluid, the fluid is introduced into the respective inlet channel 8 and is guided in the axial direction 50 by the second channel half-shells 17B. Subsequently, the fluid is guided by the first channel half-shells 17A through corresponding through-openings 20 in the radial direction 51 into the respective connecting channel 10, to be then led into the respective outlet channel 9 and finally to be led out in the axial direction 15 from the arrangement of the channel half-shells 17.

Figure 9:
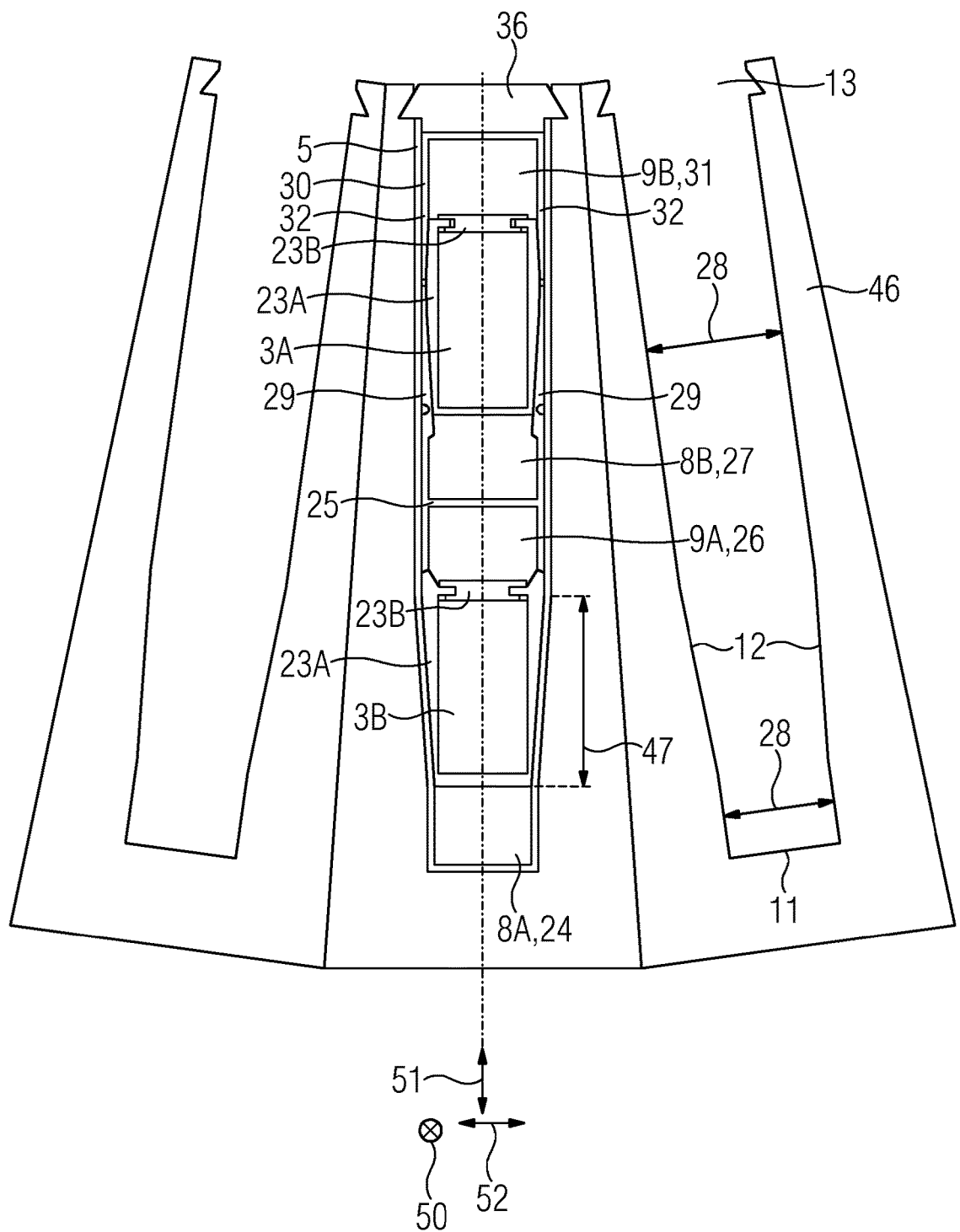
Figure 10:
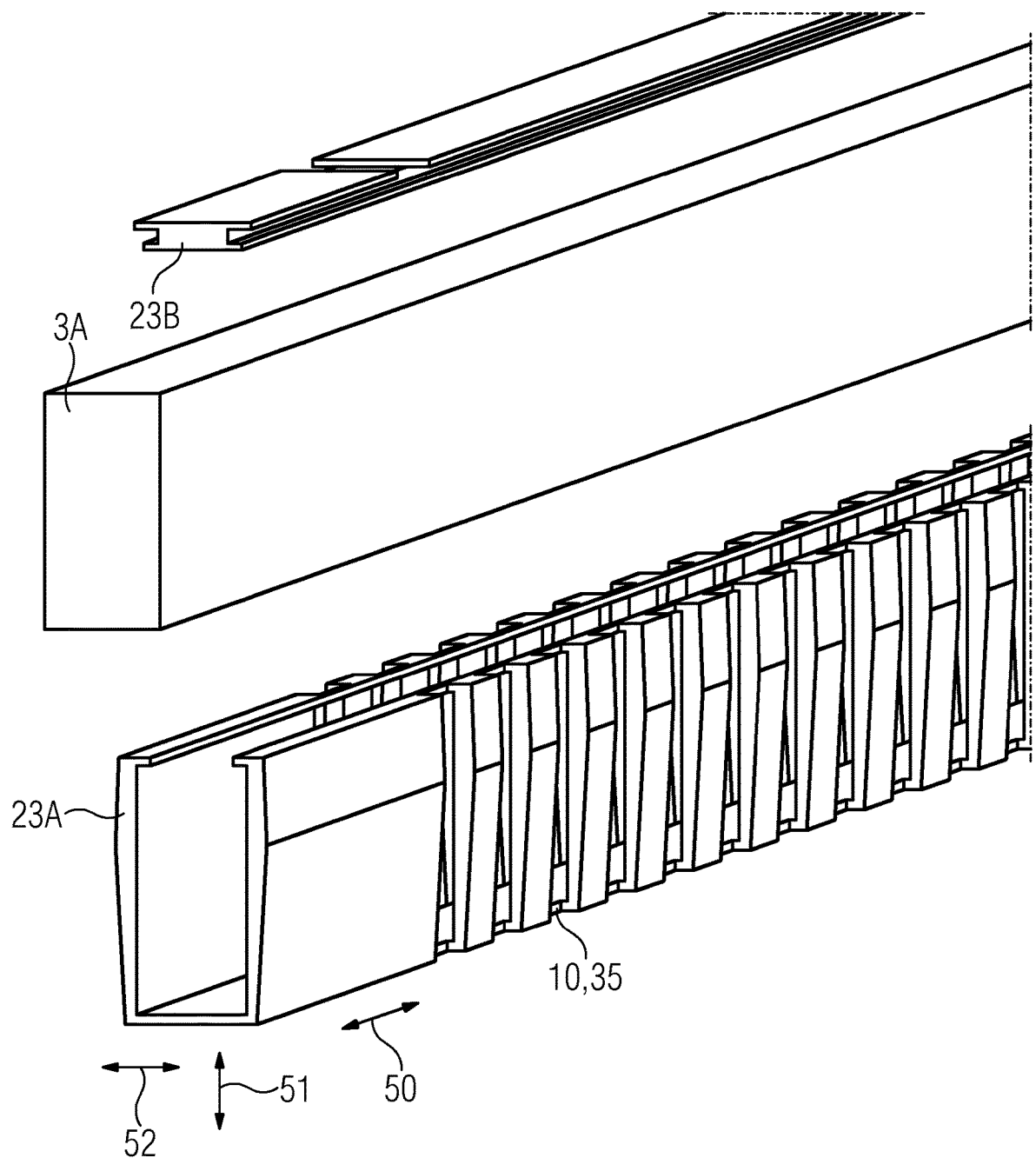

FIGS. 9 to 12 show a fifth exemplary embodiment of the fluid-cooled active part 1, with a detail or a perspective detail of a cross-section perpendicular to the axial direction 50 through the active part 1 being shown and FIG. 10 showing details of a conductor shell 23 for an upper electrical conductor 3A.

Within the framework of the exemplary embodiment, two electrical conductors 3A, 3B are provided in the respective groove 2, and these are arranged one above the other in the radial direction 51. The conductor 3A is the upper conductor facing the groove opening 13, and the conductor 3B is the lower conductor facing the groove base 11. However, it is also possible for just one of the two conductors 3A, 3B to be provided in a variation of the exemplary embodiment.

The respective main insulator 5 is configured such that the respective main insulator 5 largely covers the groove base 11 and the two groove walls 12 of the respective groove 2.

In the present exemplary embodiment, a respective conductor shell 23 that surrounds the respective conductor 3A, 3B in a plane perpendicular to the axial direction 50 is provided. The respective groove 2 has a groove region 47 along which the groove width 28 decreases in the radial direction 51 toward the groove base 11, so the respective groove 2 tapers there in the direction of the groove base 11. The respective conductor shell 23 of the lower conductor 3B likewise tapers in the corresponding region in the direction of the groove base 11, with the respective tapered portions being configured such that the respective conductor shell 23 of the lower conductor 3B is positively fixed in the direction of the groove base 11. A first, axially extending cavity 24 remains for the first inlet channel 8A between the groove base 11 and the respective conductor shell 23 of the lower conductor 3B. For example, the groove width 28 may remain constant in the region of the first cavity 24.

A respective first insert 25 that has an H-shaped cross-section in a plane perpendicular to the axial direction 50 is provided. The respective first insert 25 is arranged between the respective conductor shell 23 of the lower conductor 3B and the respective conductor shell 23 of the upper electrical conductor 3A. The respective first insert 25 is configured such that a second axially extending cavity 26 for a first outlet 9A remains between the respective conductor shell 23 of the lower conductor 3B and the respective first insert 25. A third, axially extending cavity 27 for a second inlet channel 8B remains between the respective conductor shell 23 of the upper conductor 3A and the respective first insert 25.

In a plane perpendicular to the axial direction 50, the respective first insert 25 has two outer webs 29 that point in the direction of the groove opening 13 and are arranged in certain sections in the circumferential direction 52 between the respective conductor shell 23 of the upper conductor 3A and the respective groove wall 12. The two outer webs 29 of the respective first insert 25 taper in the direction of the groove opening 13, and the respective conductor shell 23 of the upper conductor 3A tapers in certain sections in the direction of the groove base 11, with the tapered sections being configured such that the respective conductor shell 23 of the upper conductor 3A is non-positively fixed in the radial direction 51.

A respective second insert 30 that has a U-shaped cross-section in a plane perpendicular to the axial direction 50 is provided. The respective second insert 30 is arranged and configured such that a fourth axially extending cavity 31 for a second outlet channel 9B remains between the respective conductor shell 23 of the upper conductor 3A and the respective second insert 30.

In a plane perpendicular to the axial direction 50, the respective second insert 30 has two inner webs 32 that point in the direction of the groove base 11 and in certain sections in the circumferential direction, are arranged between the respective conductor shell 23 of the upper conductor 3A and the respective groove wall 12. The two inner webs 32 of the respective second insert 30 taper in the direction of the groove base 11, with the respective conductor shell 23 of the upper conductor 3A tapering in certain sections in the direction of the groove opening 13. The tapered sections are configured such that the respective conductor shell 23 of the upper conductor 3A and the respective second insert are non-positively fixed in the radial direction 51.

Within the framework of the exemplary embodiment, the respective conductor shell 23 is configured in two parts by including a first conductor shell part 23A, having an essentially U-shaped cross-section in a plane perpendicular to the axial direction 50, and a second conductor shell part 23B, as shown in FIGS. 9 and 10. The second conductor shell part 23B is in this case configured as a kind of cover for the first conductor shell part 23A. In order to surround the respective conductor 3A, 3B particularly well, the second conductor shell part 23B has two grooves and the first conductor shell part 23A has two corresponding tongues for a respective tongue and groove joint. For sealing and therefore protection of the respective conductor 3A, 3B from the fluid flowing into the respective cavity (e.g., owing to advantageous properties described above), a fluororubber may be used in the region of the tongue and groove joint.

Figure 11:
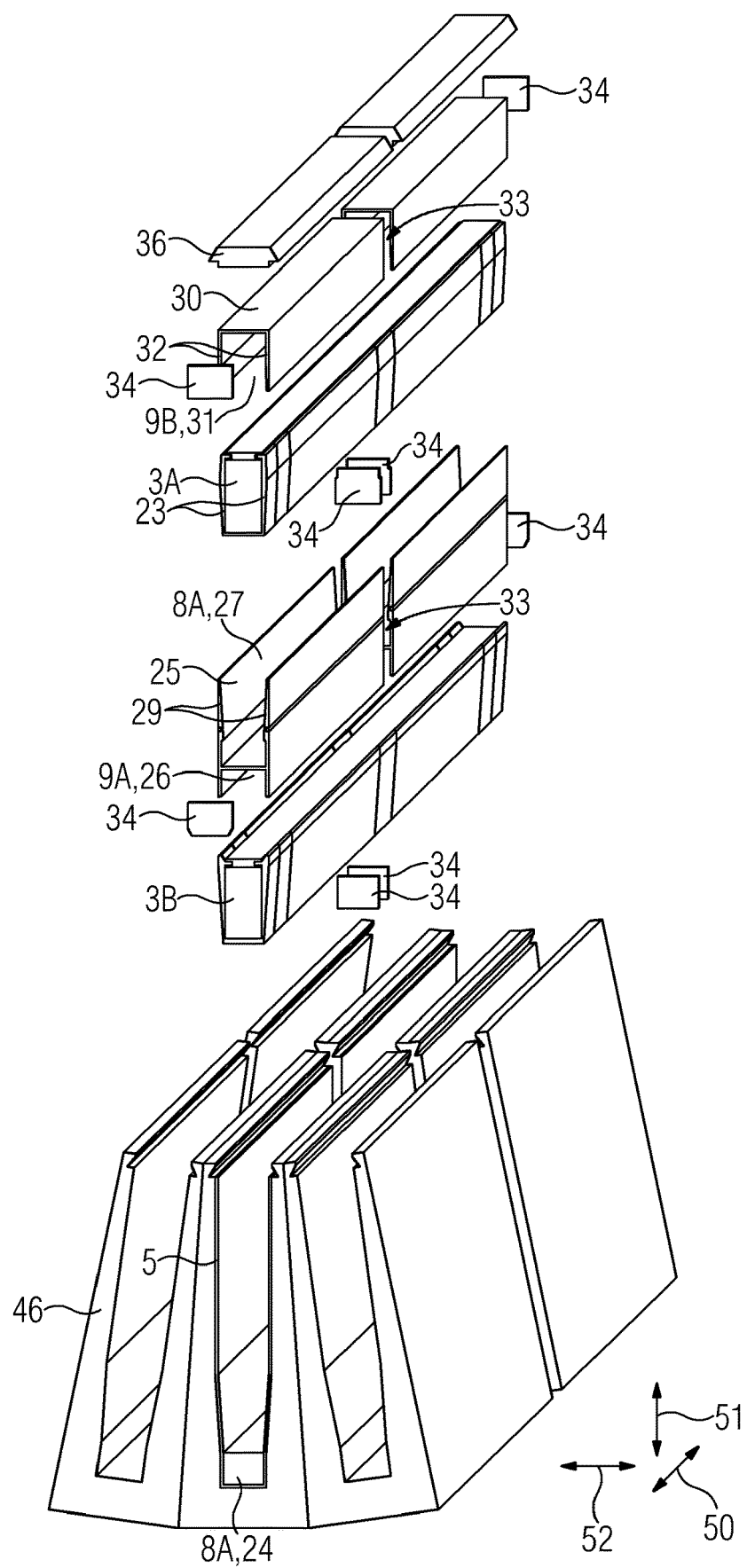
Figure 12:
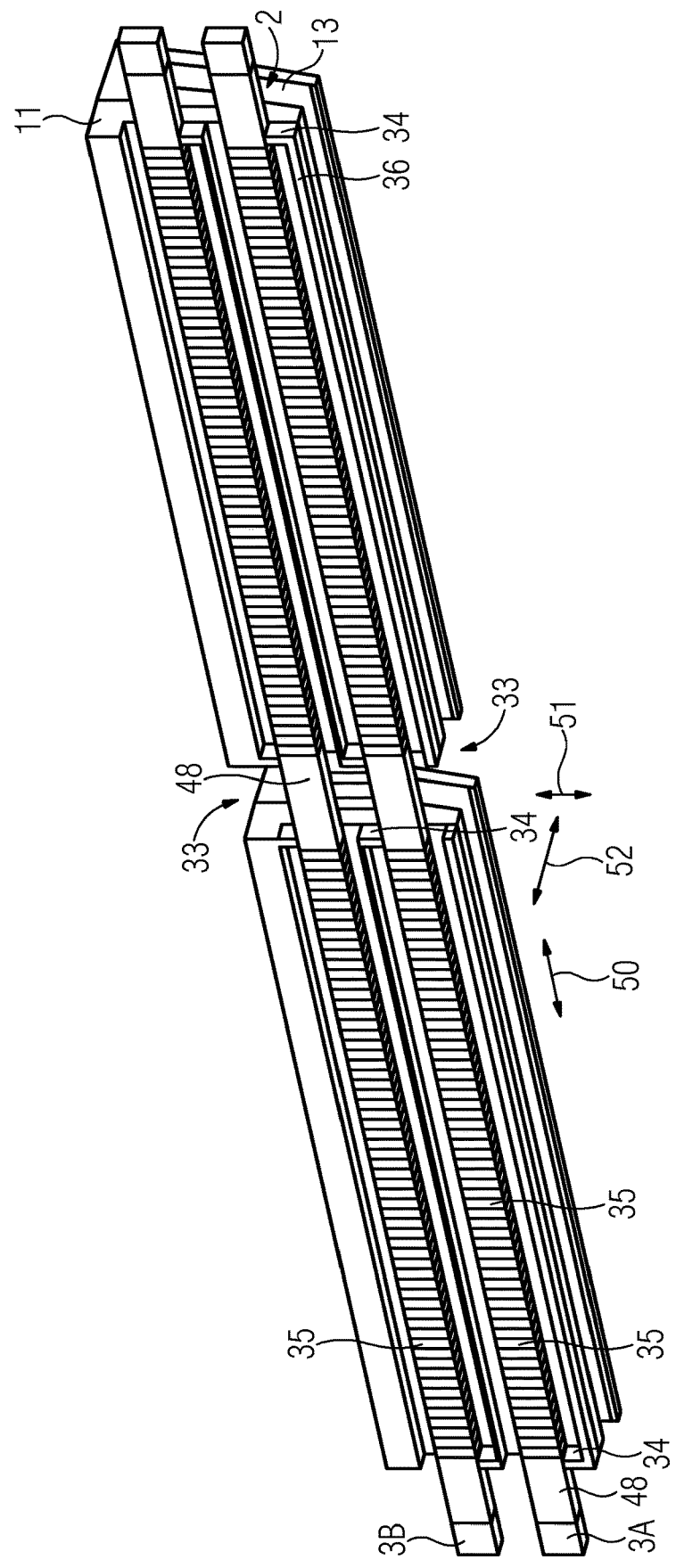

As is clear, for example, from FIGS. 11 and 12, within the framework of the exemplary embodiment, two respective inserts 15, 30 are arranged one behind the other in the axial direction 50, with a respective axial gap 33 remaining in the region of the axial center between the two respective inserts 25, 30. The first cavity 24 and the third cavity 27 are closed in the region of the axial center by a respective cover 34. Further covers 34 are provided for closing the second cavity 26 and the fourth cavity 31 at the respective axial end face.

As illustrated in FIG. 10, the respective conductor shell 23 has recesses 35 that run in the radial direction 51 and form the respective connecting channel 10.

In order to minimize the risk of potential electrical breakdowns in the region of the winding heads at the respective axial end face of the active part 1, no such recesses 35 are provided in the respective conductor shell 23 in the immediate vicinity of the respective axial end. Analogously, no such recesses 35 are provided in the respective conductor shell 23 in the immediate vicinity of the illustrated gap 33 either.

Figure 13:
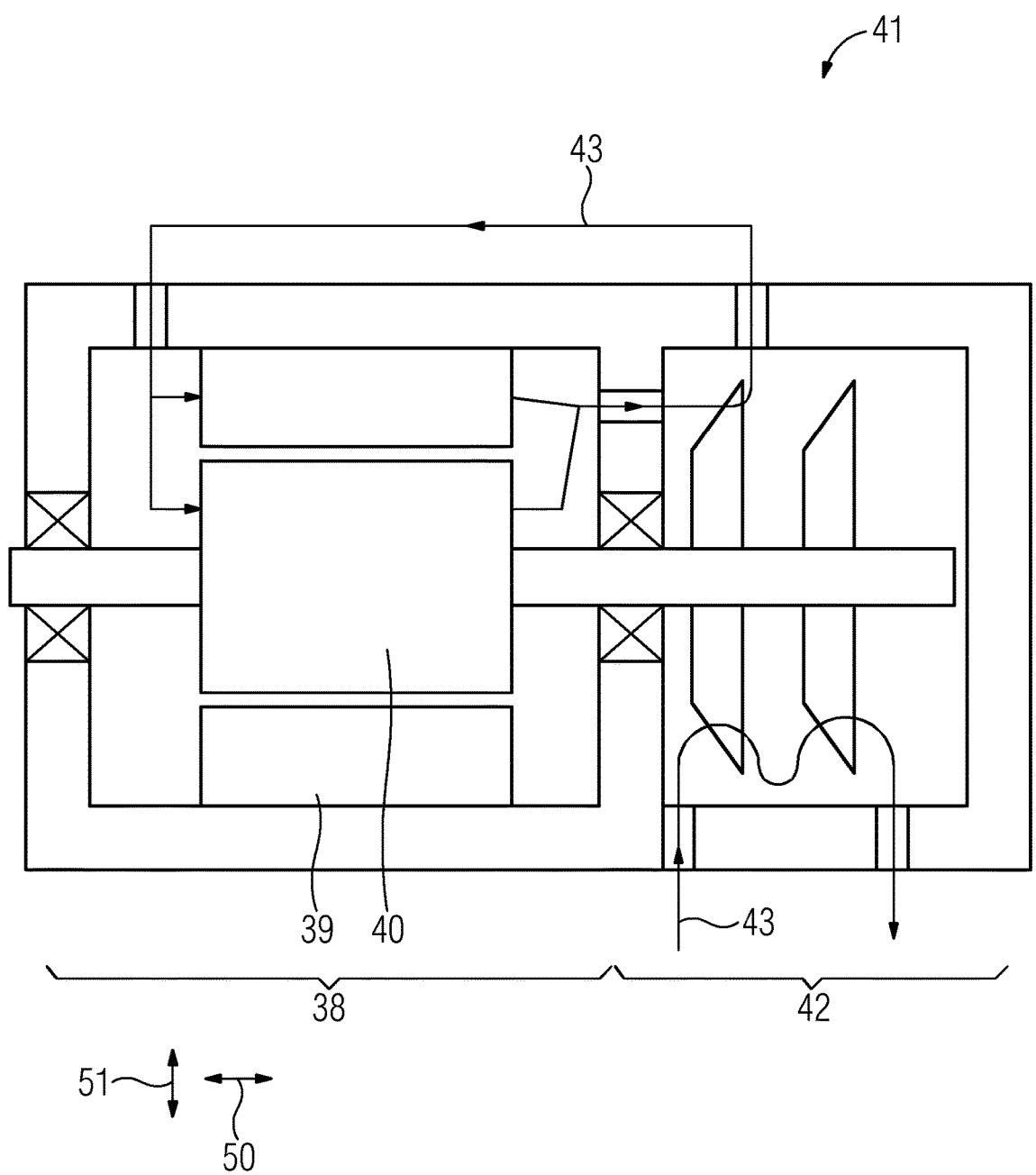
FIG. 13 shows an exemplary embodiment of an electric machine and a drive system.

FIG. 13 shows an exemplary embodiment of the proposed electric machine 38 and the proposed drive system 41, with a cross-section along the axial direction 50 being shown.

The electric machine 38 has a stator 39 and a rotatably mounted rotor 40, with the stator 39 and/or the rotor 40 being configured as the fluid-cooled active part of one or more of the present embodiments. The electric machine 38 may be operated with an electrical voltage in the range of a few kilovolts (e.g., a few tens of kilovolts).

The electric machine 38 is part of the drive system 41, further including a fluid energy machine 42 for the fluid, with the fluid energy machine 42 being configured as a compressor (e.g., for a process gas) or as a pump (e.g., for a process fluid). The arrows 43 indicate the flows of the fluid in the electric machine 38 and in the fluid energy machine 42.

To summarize, one or more of the present embodiments relate to a fluid cooled active part for an electric machine, where the active part is essentially cylindrical or hollow-cylindrical. The fluid cooled active part has axially extending grooves, at least one electrical conductor that, in each case, is arranged at least in certain sections in the respective groove and is composed of a plurality of sub-conductors, and a respective main insulator. The respective main insulator is arranged between the respective conductor and the respective groove. The fluid cooled active part includes a respective sub-conductor insulator that surrounds the respective sub-conductor. One or more of the present embodiments relate to an electric machine having a fluid-cooled active part configured as a stator, and/or a fluid-cooled active part configured as a rotatably mounted rotor. The electric machine may be operated with an electrical voltage in the range of at least a few kilovolts (e.g., a few tens of kilovolts). One or more of the present embodiments relate to a drive system having an electric machine and a fluid energy machine for the fluid. The fluid energy engine is configured, for example, as a compressor (e.g., for a process gas) or as a pump (e.g., for a process fluid).

In order to overcome drawbacks from the prior art and to provide a fluid-cooled active part that is powerful, compact and, for example, resistant in the environment of the fluid and a process fluid, the active part may have a respective cooling channel for guiding the fluid (e.g., a process fluid). The respective cooling channel is arranged between the respective main insulator and the respective sub-conductor insulator. A corresponding electric machine and a corresponding drive system are provided.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A fluid-cooled active part for an electric machine, wherein the fluid-cooled active part is essentially cylindrical or hollow cylindrical, the fluid-cooled active part comprising:
    axially extending grooves;
    at least one electrical conductor that in each case is arranged in a respective groove of the axially extending grooves at least in certain sections and is composed of a plurality of sub-conductors;
    a respective main insulator that is arranged between the respective conductor and the respective groove;
    a respective sub-conductor insulator that surrounds a respective sub-conductor of the plurality of sub-conductors; and
    a respective cooling channel for guiding a fluid,
    wherein the respective cooling channel is arranged between the respective main insulator and the respective sub-conductor insulator, and
    wherein the fluid is a process fluid.

2. The fluid-cooled active part of claim 1,
    wherein the respective cooling channel has an inlet channel, an outlet channel, and a respective connecting channel for fluidically connecting the inlet channel to the outlet channel,
    wherein the respective groove has a groove base and two groove walls,
    wherein the respective inlet channel or the respective outlet channel is arranged between the respective conductor and the groove base or the groove opening that opposes the groove base in a radial direction, and
    wherein the respective connecting channel is arranged at least predominantly between the respective conductor and one of the two groove walls.

3. An electric machine comprising:
    a first fluid-cooled active part configured as a stator, a second fluid-cooled active part configured as a rotatably mounted rotor, or the first fluid-cooled active part and the second fluid-cooled active part, the first fluid-cooled active part, the second fluid-cooled active part, or the first fluid-cooled active part and the second fluid-cooled active part each being essentially cylindrical or hollow cylindrical, and comprising:
axially extending grooves;
at least one electrical conductor that in each case is arranged in a respective groove of the axially extending grooves at least in certain sections and is composed of a plurality of sub-conductors;
a respective main insulator that is arranged between the respective conductor and the respective groove;
a respective sub-conductor insulator that surrounds a respective sub-conductor of the plurality of sub-conductors; and
a respective cooling channel for guiding a fluid,
wherein the respective cooling channel is arranged between the respective main insulator and the respective sub-conductor insulator,
wherein the fluid is a process fluid, and
wherein the electric machine is operable with an electrical voltage in the range of at least three kilovolts.

4. A drive system comprising:
an electric machine comprising:
a first fluid-cooled active part configured as a stator, a second fluid-cooled active part configured as a rotatably mounted rotor, or the first fluid-cooled active part and the second fluid-cooled active part, the first fluid-cooled active part, the second fluid-cooled active part, or the first fluid-cooled active part and the second fluid-cooled active part each being essentially cylindrical or hollow cylindrical, and comprising:
axially extending grooves;
at least one electrical conductor that in each case is arranged in a respective groove of the axially extending grooves at least in certain sections and is composed of a plurality of sub-conductors;
a respective main insulator that is arranged between the respective conductor and the respective groove;
a respective sub-conductor insulator that surrounds a respective sub-conductor of the plurality of sub-conductors; and
a respective cooling channel for guiding a fluid, wherein the respective cooling channel is arranged between the respective main insulator and the respective sub-conductor insulator, and wherein the electric machine is operable with an electrical voltage in the range of at least three kilovolts; and
a fluid energy machine for the fluid,
wherein the fluid is a process fluid, and
wherein the fluid energy machine is configured as a compressor or as a pump.

* * * * *